United States Patent
Fujino (10) Patent No.: US 10,129,771 B2
(45) Date of Patent: Nov. 13, 2018

(54) WIRELESS COMMUNICATION SYSTEM, WIRELESS COMMUNICATION METHOD, AND NON-TRANSITORY COMPUTER READABLE MEDIUM STORING WIRELESS COMMUNICATION PROGRAM

(71) Applicant: NEC CORPORATION, Tokyo (JP)

(72) Inventor: Shozo Fujino, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/548,469

(22) PCT Filed: Feb. 19, 2016

(86) PCT No.: PCT/JP2016/000892
§ 371 (c)(1),
(2) Date: Aug. 3, 2017

(87) PCT Pub. No.: WO2016/147559
PCT Pub. Date: Sep. 22, 2016

(65) Prior Publication Data
US 2018/0027426 A1    Jan. 25, 2018

(30) Foreign Application Priority Data
Mar. 18, 2015   (JP) .................................. 2015-054533

(51) Int. Cl.
*H04W 24/02*   (2009.01)
*H04L 12/24*   (2006.01)
(Continued)

(52) U.S. Cl.
CPC ............. *H04W 24/02* (2013.01); *H04L 41/12* (2013.01); *H04W 8/005* (2013.01); *H04W 84/12* (2013.01)

(58) Field of Classification Search
CPC .......... H04B 17/00; H04B 3/46; H04L 43/00; H04L 43/50; H04L 41/12; H04W 24/00; H04W 24/02; H04W 84/12; H04W 8/005
(Continued)

(56) References Cited

U.S. PATENT DOCUMENTS 8,792,371 B2 *  7/2014  Woo ..................... H04W 84/20
                                                370/252
9,775,007 B2 *  9/2017  Wang ..................... H04W 4/08
(Continued)

FOREIGN PATENT DOCUMENTS

| JP | 2009-219051 A | 9/2009 |
| JP | 2014-193218 A | 10/2014 |
| JP | 2015-023371 A | 2/2015 |

OTHER PUBLICATIONS

International Search Report for PCT/JP2016/000892, dated May 10, 2016.
(Continued)

*Primary Examiner* — Robert J Lopata
(74) *Attorney, Agent, or Firm* — Sughrue Mion, PLLC (57) ABSTRACT

In a wireless communication system (1), a hard AP (10) including a station function (15) activates a soft AP function (22) of a wireless LAN device (20) included in a first combination composed of one or a plurality of wireless LAN devices (20) to check scan responsiveness, activates the soft AP function (22) of the wireless LAN device (20) included in other combination, and activates the soft AP function (22) of the wireless LAN device (20) included in a combination having higher scan responsiveness from between that of the first combination and that of the other combination.

3 Claims, 4 Drawing Sheets

(51) Int. Cl.
*H04W 8/00* (2009.01)
*H04W 84/12* (2009.01)

(58) Field of Classification Search
USPC .......................................................... 370/252
See application file for complete search history.

(56) References Cited

U.S. PATENT DOCUMENTS

| | | | | |
|---|---|---|---|---|
| 9,894,665 | B2* | 2/2018 | Reddy | H04W 72/085 |
| 9,913,107 | B2* | 3/2018 | Kawakami | H04W 4/08 |
| 9,942,728 | B2* | 4/2018 | Kanno | H04W 4/08 |
| 10,004,095 | B2* | 6/2018 | Jung | H04W 76/14 |
| 2008/0320108 | A1* | 12/2008 | Murty | H04W 48/20 709/220 |
| 2010/0085907 | A1 | 4/2010 | Yasumoto | |
| 2011/0034127 | A1* | 2/2011 | Wentink | H04W 76/022 455/41.2 |
| 2011/0149816 | A1* | 6/2011 | Saito | H04W 4/08 370/310 |
| 2013/0339504 | A1* | 12/2013 | Montemurro | H04W 12/06 709/223 |
| 2014/0177615 | A1* | 6/2014 | Kim | H04W 8/005 370/338 |
| 2014/0200030 | A1* | 7/2014 | Barathalwar | H04W 4/025 455/456.2 |
| 2014/0201280 | A1* | 7/2014 | Qi | H04W 84/20 709/204 |
| 2015/0055575 | A1* | 2/2015 | Fujino | H04L 61/2015 370/329 |
| 2015/0085725 | A1* | 3/2015 | Estevez | H04W 52/0206 370/311 |
| 2015/0146548 | A1* | 5/2015 | Wang | H04W 52/04 370/252 |
| 2015/0156709 | A1* | 6/2015 | Shukla | H04W 48/16 370/338 |
| 2015/0163300 | A1* | 6/2015 | Kumar | H04L 67/1046 709/205 |
| 2015/0181633 | A1* | 6/2015 | Kim | H04W 8/005 370/329 |
| 2015/0245393 | A1* | 8/2015 | Lee | H04W 8/005 370/338 |
| 2016/0021586 | A1* | 1/2016 | Akhi | H04W 36/06 370/229 |
| 2016/0037436 | A1* | 2/2016 | Spencer | H04W 48/12 370/338 |
| 2016/0057215 | A1* | 2/2016 | Rayanki | H04L 67/1051 709/228 |
| 2016/0081124 | A1* | 3/2016 | Yang | H04W 76/10 370/329 |
| 2016/0127950 | A1* | 5/2016 | Gupta | H04W 48/16 370/255 |
| 2016/0165414 | A1* | 6/2016 | Lee | H04W 76/14 370/331 |
| 2016/0234626 | A1* | 8/2016 | Ray | H04W 4/005 |
| 2018/0098229 | A1* | 4/2018 | Park | H04W 88/04 |

OTHER PUBLICATIONS

Communication dated Sep. 14, 2018, issued by the Korean Intellectual Property Office in counterpart application No. 10-2017-7029693.

* cited by examiner

WIRELESS COMMUNICATION SYSTEM, WIRELESS COMMUNICATION METHOD, AND NON-TRANSITORY COMPUTER READABLE MEDIUM STORING WIRELESS COMMUNICATION PROGRAM

TECHNICAL FIELD

The present disclosure relates to a wireless communication system, a wireless communication method, and a non-transitory computer readable medium storing a wireless communication program.

BACKGROUND ART

A wireless local area network (hereinafter abbreviated as "LAN") is constructed inside a store (see Patent Literature 1). An in-store wireless LAN commonly accommodates all stations by one or two access points (hereinafter abbreviated as "AP") connected to a wired LAN. Further, when there is a wireless LAN device in which both a station and a soft AP can be mounted at the same time, it is possible to apply a plurality of network topologies as paths leading to the wired LAN. However, in such a case, the wireless LAN device for activating the soft AP is previously determined. In such an in-store wireless LAN environment, it has been necessary for a user to manually reinstall the wireless LAN device in consideration of communication quality at the timing of changing a layout and the like.

CITATION LIST

Patent Literature

Patent Literature 1: Japanese Unexamined Patent Application Publication No. 2014-193218

SUMMARY OF INVENTION

Technical Problem

In a wireless LAN constructed inside a store, wireless LAN communication is suddenly interrupted from time to time when a new wireless LAN device is installed or when a layout of product display shelves is changed even if communication quality of the wireless LAN communication had no problem until then.

As means for measuring the communication quality of the wireless communication, there is means for measuring an error rate of a communication frame and the like. However, even with such means, communication for aggregating databases of communication quality measured by individual wireless LAN devices in one place is eventually necessary, thereby increasing the number of frames as a whole system.

The present disclosure has been made to solve such a problem. An object of the present disclosure is to provide a wireless communication system, a wireless communication method, and a non-transitory computer readable medium storing a wireless communication program that can automatically measure communication quality in a small number of frames and reconfigure a network topology at a timing including when a new wireless LAN device is installed, when a layout of product display shelves is changed and the like, thereby enabling wireless LAN communication over a path in which the influence of interrupting objects is small.

Solution to Problem

A wireless communication system according to the present disclosure includes: a hard AP including a station function; and a plurality of wireless LAN devices each including a soft AP function. The hard AP scans the soft AP of the wireless LAN device belonging to the hard AP, detects deterioration of scan responsiveness of the soft AP, deactivates the soft AP function of the wireless LAN device belonging to the hard AP, activates the soft AP function of the wireless LAN device constituting a first combination, the first combination including one or a plurality of wireless LAN devices, checks the scan responsiveness of the wireless LAN device included in the first combination, activates the soft AP function of the wireless LAN device constituting other combination different from the first combination, the other combination including one or a plurality of wireless LAN devices, checks the scan responsiveness of the wireless LAN device included in the other combination, and activates the soft AP function of the wireless LAN device constituting a combination having higher scan responsiveness from between that of the first combination and that of the other combination.

Advantageous Effects of Invention

According to the present disclosure, it is possible to provide a wireless communication system, a wireless communication method, and a non-transitory computer readable medium storing a wireless communication program that can automatically measure communication quality in a small number of frames and reconfigure a network topology at a timing including when a new wireless LAN device is installed, when a layout of product display shelves is changed, and the like, thereby enabling wireless LAN communication over a path in which the influence of interrupting objects is small.

DESCRIPTION OF EMBODIMENTS

First Embodiment of the Invention

Next, a wireless communication system according to a first embodiment will be described with reference to the drawings.

In the wireless communication system according to the first embodiment, when there are a plurality of wireless LAN devices each equipped with both a station function and a soft AP function at the same time and a hard AP, the hard AP automatically measures scan responsiveness, determines the wireless LAN devices to be the soft APs on a path, and reconfigure a network topology.

First, a configuration of the wireless communication system according to the first embodiment will be described.

Figure 1:
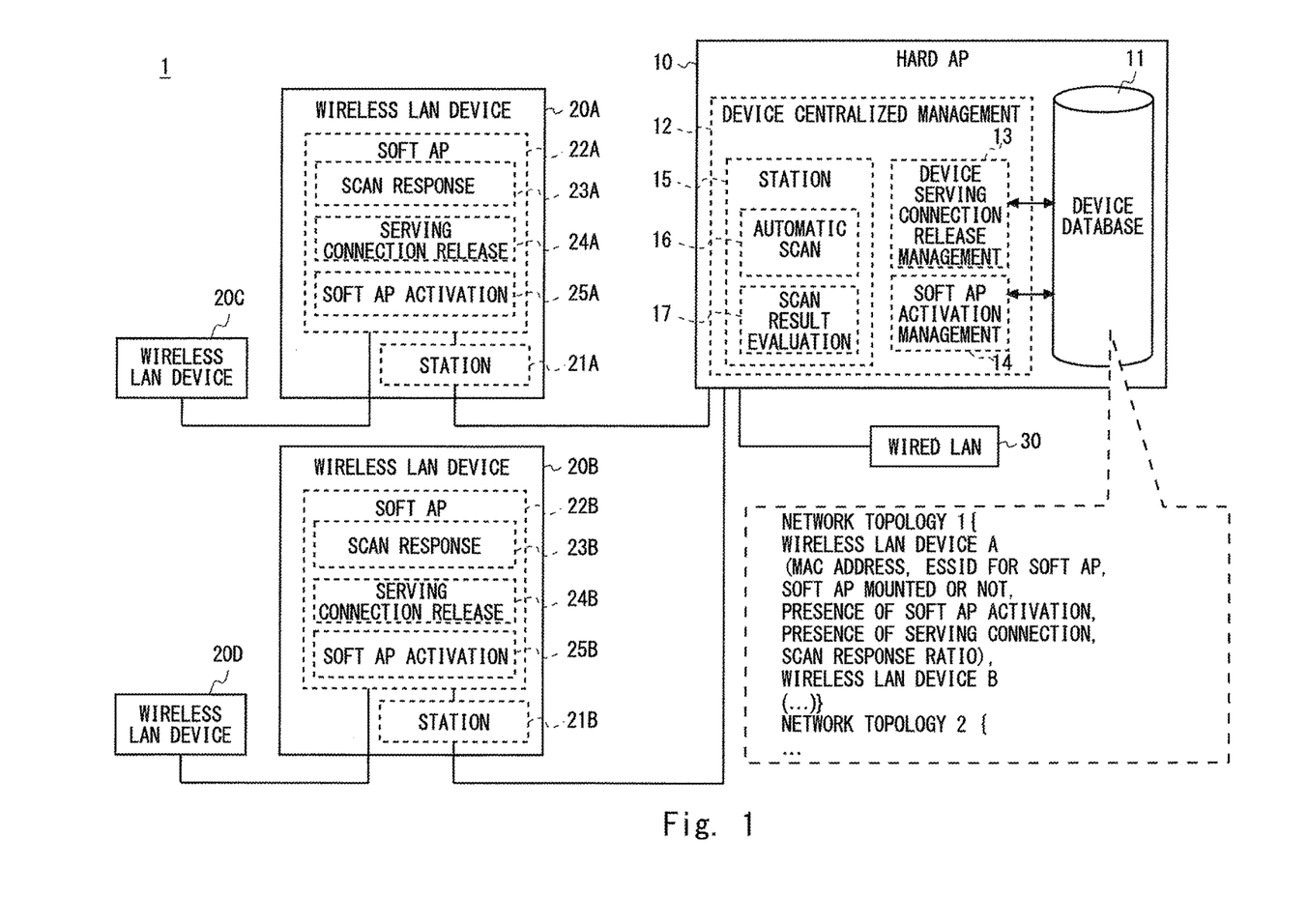
FIG. 1 is a block diagram showing a schematic configuration of a wireless communication system 1 according to a first embodiment.

FIG. 1 is a block diagram showing a schematic configuration of a wireless communication system 1 according to the first embodiment.

The wireless communication system 1 includes a hard AP 10, four wireless LAN devices 20A to 20D, and the like. In this specification, in order to distinguish the hard AP from a "soft AP", which will be described later, a hardware access point commonly called an "access point" will be referred to as a "hard AP".

The hard AP 10 includes a device database 11 inside. The device database 11 stores network topology information and the like. Further, the hard AP 10 includes a device centralized management function 12 as a software function. The software function is a function that can be implemented by activating software. In FIG. 1, the software functions are indicated by dotted lines.

The device centralized management function 12 includes a device serving connection release management function 13, a software AP activation management function 14, and a station function 15. The station function 15 includes an automatic scan function 16 and a scan result evaluation function 17. Details of the respective functions will be revealed in the description of a wireless communication method later.

Further, a wired LAN 30 is connected to the hard AP 10.

On the other hand, the wireless LAN device 20A includes a station function 21A and an access point (software AP) function 22A as software functions. Therefore, the wireless LAN device 20A can be a station and an access point at the same time.

The soft AP function 22A includes a scan response function 23A, a serving connection release function 24A, and a software AP activation function 25A.

Note that the four wireless LAN devices 20A to 20D have the same configuration. Illustration of detailed configurations of the wireless LAN devices 20C and 20D and the descriptions of the configurations of the wireless LAN devices 20B to 20D are omitted.

Moreover, initially, that is, prior to the timing of installation of a new wireless LAN device or change of a layout of product display shelves, the wireless LAN devices 20A and 20B belong to the hard AP 10 as stations, and the wireless LAN devices 20C and 20D belong to the soft APs of the wireless LAN devices 20A and 20B as stations, respectively.

Each of the components implemented by the hard AP 10 or the wireless LAN devices 20A to 20D is implemented by executing a program by, for example, the control of an arithmetic device (not shown) included in the hard AP 10 or the wireless LAN devices 20A to 20D. To be more specific, the hard AP 10 or the wireless LAN devices 20A to 20D is implemented by loading a program stored in a storage unit (not shown) to a main storage device (not shown) and executing the program by the control of the arithmetic device. Further, the components may not only be implemented by software including programs but also implemented by a combination of hardware, firmware, and software and the like.

The above program can be stored and provided to the hard AP 10 or the wireless LAN devices 20A to 20D using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (Programmable ROM), EPROM (Erasable PROM), flash ROM, RAM (random access memory), etc.).

The program may be provided to the hard AP 10 or the wireless LAN devices 20A to 20D using any type of transitory computer readable media. Examples of transitory computer readable media include electric signals, optical signals, and electromagnetic waves. Transitory computer readable media can provide the program to the hard AP 10 or the wireless LAN devices 20A to 20D via a wired communication line (e.g. electric wires, and optical fibers) or a wireless communication line.

Next, an operation of the above-described wireless communication system 1, i.e., the wireless communication method, will be described.

Figure 2:
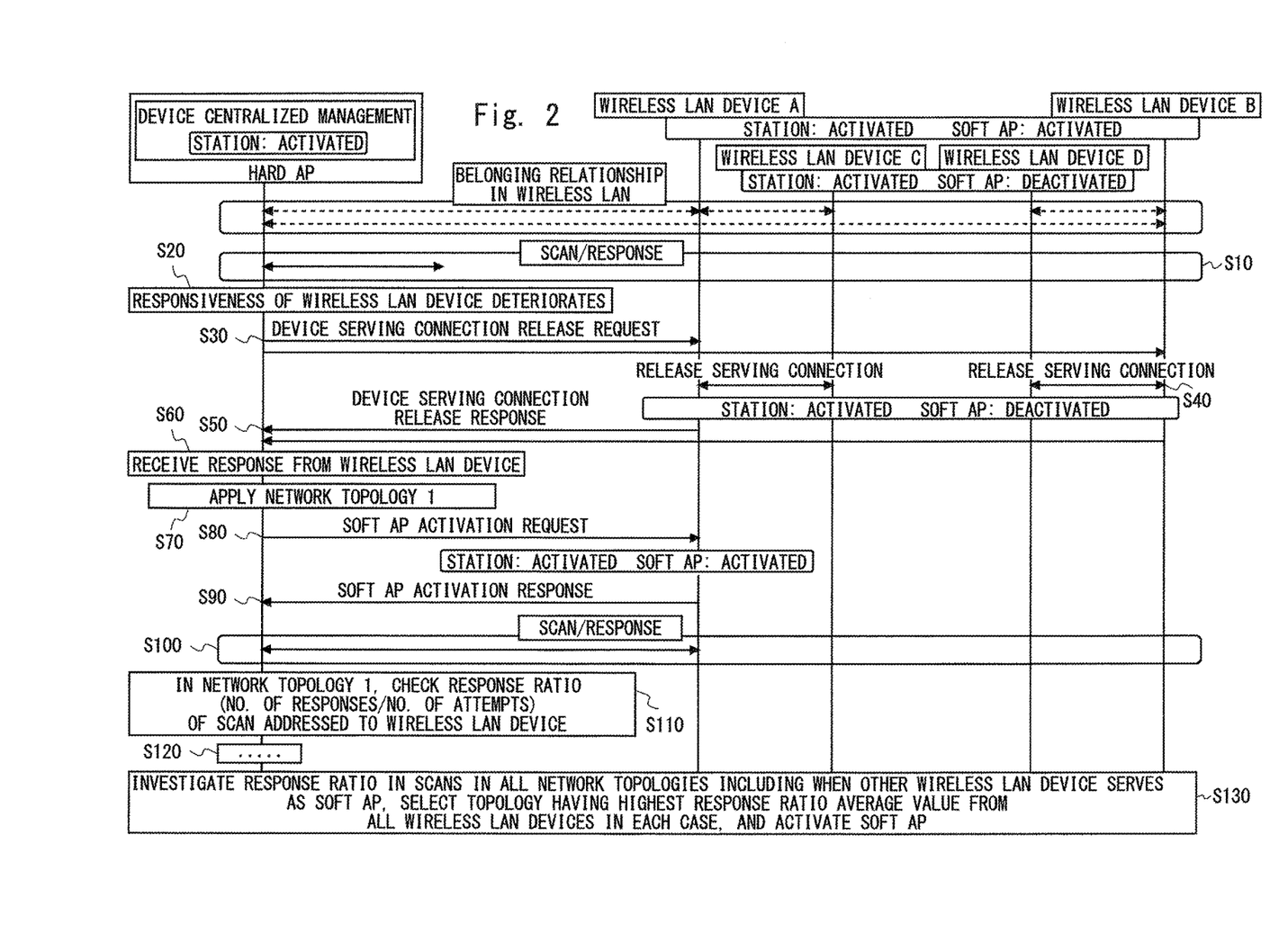
FIG. 2 is a sequence diagram for describing a wireless communication method according to the first embodiment.

FIG. 2 is a sequence diagram for describing the wireless communication method according to the first embodiment. In FIG. 2, in order to distinguish between the wireless LAN devices 20A to 20D, they are referred to as the wireless LAN devices A to D, respectively.

In the wireless communication system 1, initially, the hard AP 10 functions as an access point, and additionally, the station function 15 as a software function is activated. Moreover, in the wireless LAN devices 20A and 20B, the station functions 21A and 21B and the soft AP functions 22A and 22B are activated, respectively. In each of the wireless LAN devices 20C and 20D, the station function is activated and the soft AP function is deactivated.

As described above, the wireless LAN devices 20A and 20B belong to the hard AP 10 as stations, and the wireless LAN devices 20C and 20D belong to the soft APs of the wireless LAN devices 20A and 20B as stations, respectively.

The automatic scan function 16 of the hard AP 10 scans the soft APs of the wireless LAN devices 20A and 20B at certain regular intervals or at an arbitrary timing to check responsiveness of the wireless LAN devices 20A and 20B (Step S10). Note that the scan response functions 23A and 23B of the respective wireless LAN devices 20A and 20B respond to the scanning of the hard AP 10.

When the scan result evaluation function 17 of the hardware AP 10 recognizes that the responsiveness of the wireless LAN device 20A or 20B has deteriorated (Step S20), the device serving connection release management function 13 outputs a device serving connection release request to the wireless LAN devices 20A and 20B (Step S30). The responsiveness of the wireless LAN device 20A or 20B is deteriorated, for example, when a new wireless LAN device is installed or a layout of product display shelves is changed.

Then, the serving connection release functions 24A and 24B of the wireless LAN devices 20A and 20B release the connections with the serving wireless LAN devices 20C and 20D, respectively (Step S40).

After Step S40, in each of the four wireless LAN devices 20A to 20D, the station function 21 is activated and the soft AP function 22 is deactivated.

Next, the wireless LAN devices 20A and 20B each output a device serving connection release response to the hard AP 10 (Step S50).

When the hard AP 10 receives the device serving connection release responses from the wireless LAN devices 20A and 20B (Step S60), it applies a network topology 1 (Step S70).

Next, the soft AP activation management function 14 of the hard AP 10 outputs a soft AP activation request to the wireless LAN device 20A (Step S80).

Thus, the soft AP activation function 25A of the wireless LAN device 20A activates the soft AP function 22A, and the station function 21A and the soft AP function 22A of the wireless LAN device 20A are activated. Note that in each of the wireless LAN devices 20B to 20D, the station function 21 remains activated, and the soft AP function 22 remains deactivated.

Next, the wireless LAN device 20A outputs a soft AP activation response to the hard AP 10 (Step S90).

Next, the automatic scan function 16 of the hard AP 10 scans the wireless LAN device 20A having the activated soft AP function 22A (Step S100) to check the responsiveness of the wireless LAN device 20A in the network topology 1 (Step S110). Note that in the checking of the responsiveness, a fixed number of times of the scanning is issued to the wireless LAN devices in a unit time, and a response ratio (the number of responses/the number of attempts) is made into a database. Further, in the checking of the responsiveness, an average value of the reception strength in the wireless LAN device instead of the response ratio may be used.

In this way, it is possible to check the communication quality between the hard AP 10 and the wireless LAN device 20A.

Next, the hard AP 10 deactivates the soft AP function 22A of the wireless LAN device 20A (not shown).

Likewise, the hard AP 10 applies other network topologies to check responsiveness of the wireless LAN devices 20A to 20D (Step S120). Note that in the other network topologies, like in the network topology 1, the software AP function 22 of one wireless LAN device 20 is activated to check the responsiveness of the wireless LAN device 20 or the software AP functions 22 of a plurality of wireless LAN devices 20 are activated at the same time to check the responsiveness of the plurality of wireless LAN devices 20 (an average value of response ratios of the plurality of wireless LAN devices or an average value of reception strength of the plurality of wireless LAN devices).

A difference between the network topology 1 and the other network topologies is in a combination of one or a plurality of wireless LAN devices 20 that activate the soft AP functions 22. For example, in a network topology 2, the soft AP function 22B of the wireless LAN device 20B is activated. In a network topology 3, the soft AP functions 22 of the wireless LAN devices 20C and 20D are activated. In a network topology 4, the soft AP functions 22 of the wireless LAN devices 20A to 20D are activated. Therefore, the hard AP 10 can apply the network topologies having combinations selecting one to four wireless LAN devices 20 from among the four wireless LAN devices 20.

The operation relating to Step S120 is a repetition of the same operations as the operations of Steps S70 to S110, and illustration and description thereof will be omitted here.

The scan result evaluation function 17 of the hard AP 10 extracts the network topology having the highest responsiveness (the response ratio, the average value of response ratios, or the average value of reception strength) from among all the network topologies. Further, the hard AP 10 outputs the soft AP activation request again to one or a plurality of wireless LAN devices 20, the soft AP functions 22 of which had been once activated in the extracted network topology, so that the station functions 21 and the software AP functions 22 of the one or a plurality of wireless LAN devices 20 are activated (Step S130).

At this time, the other wireless LAN devices 20 having the activated station functions 21 and the deactivated soft AP functions 22 are made to belong to the wireless LAN devices 20 having the activated station functions 21 and the activated soft AP functions 22 or to the hard AP 10.

Then, the process returns to Step S10.

With such a configuration, it is possible to automatically measure the communication quality in a small number of frames and reconfigure the network topology at a timing including when a new wireless LAN device is installed, when a layout of product display shelves is changed, and the like, thereby enabling wireless LAN communication over a path in which the influence of interrupting objects is small. At this time, it is not necessary to install new hardware.

Note that in the wireless communication system according to the first embodiment, the scan for each network topology for examining the communication quality is issued from the device centralized management function 12 of the hard AP 10. However, the scan may be issued from all the stations including the stations of the wireless LAN devices 20, a result of the responses may be accumulated in each station, and the device centralized management function 12 may collect the results from the stations.

As described so far, the wireless communication system 1 according to the first embodiment includes the hard AP 10 including the station function 15 and the plurality of wireless LAN devices 20A to 20D each including the soft AP function 22. The hard AP 10 scans the soft APs of the wireless LAN devices 20A and 20B belonging to the hard AP 10, detects deterioration of scan responsiveness of the soft AP, deactivates the soft AP functions 22 of all the wireless LAN devices 20A to 20D belonging to the hard AP 10, activates the soft AP function 22 of the wireless LAN device 20 constituting the first combination, the first combination including one or a plurality of wireless LAN devices 20, checks the scan responsiveness of the wireless LAN device 20 included in the first combination, activates the soft AP function 22 of the wireless LAN device 20 constituting other combination different from the first combination, the other combination including one or a plurality of wireless LAN devices 20, checks the scan responsiveness of the wireless LAN device 20 included in the other combination, and activates the soft AP function 22 of the wireless LAN device 20 constituting a combination having higher scan responsiveness from between that of the first combination and that of the other combination.

The wireless communication method according to the first embodiment is performed by the hard AP 10 including the station function 15. The wireless communication method includes: the Step S10 for scanning the soft APs of the wireless LAN devices 20A and 20B belonging to the hard AP 10; the Step S20 for detecting deterioration of scan responsiveness of the soft AP; the Steps S30 to S60 for deactivating the soft AP functions 22A, 22B of the wireless LAN devices 20A, 20B belonging to the hard AP 10; the Steps S70 to S90 for activating the soft AP function 22 of the wireless LAN device 20 constituting the first combination including one or a plurality of wireless LAN devices 20; the Steps S100 to S110 for checking the scan responsiveness of the wireless LAN device 20 included in the first combination; the Step S120 for activating the soft AP function 22 of the wireless LAN device 20 included in other combination different from the first combination, the other combination including one or a plurality of wireless LAN devices 20; the Step S120 for checking the scan responsiveness of the wireless LAN device 20 included in the other combination; and the Step S130 for activating the soft AP function 22 of the wireless LAN devices included in a combination having higher scan responsiveness from between that of the first combination and that of the other combination.

Second Embodiment of the Invention

Note that the present disclosure is not limited to the first embodiment, and modifications can be made as appropriate without departing from the scope thereof.

In a wireless communication system according to a second embodiment, a Wi-Fi Direct device is used as a wireless LAN device.

Figure 3:
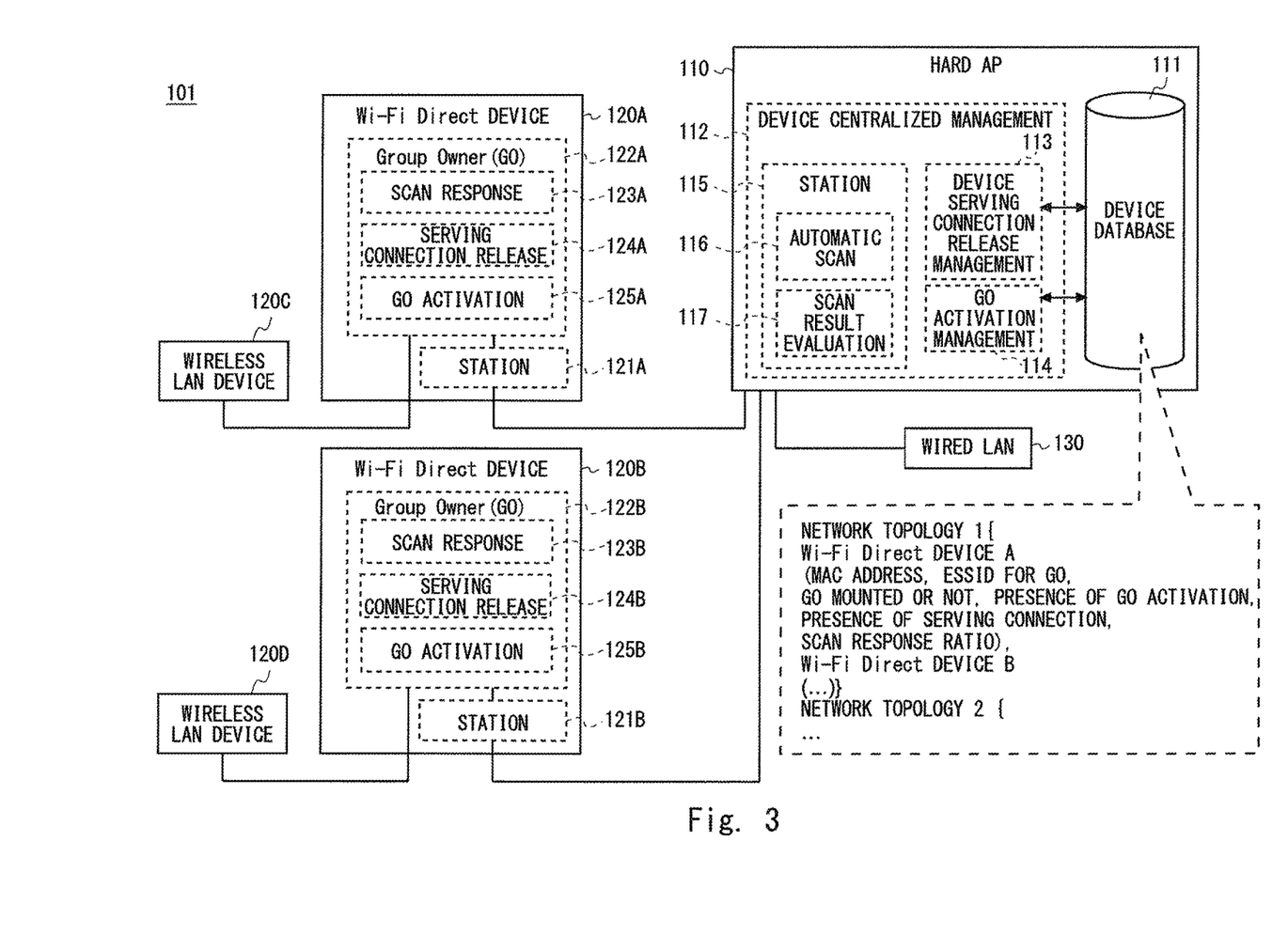
FIG. 3 is a block diagram showing a schematic configuration of a wireless communication system 101 according to a second embodiment.

FIG. 3 is a block diagram showing a schematic configuration of a wireless communication system 101 according to the second embodiment. In FIG. 3, the software functions are indicated by dotted lines.

The wireless communication system 101 according to the second embodiment includes a hard AP 110, Wi-Fi Direct devices 120A and 120B, wireless LAN devices 120C and 120D, and the like. A device centralized management function 112, which is a software function of the hard AP 110, includes a Group Owner (hereinafter abbreviated as "GO") activation function 114, a station function 115, and the like. The station function 115 includes an automatic scan function 116 and a scan result evaluation function 117. The Wi-Fi Direct device 120A includes a GO function 122A and the like. The GO function 122A includes a scan response function 123A, a serving connection release function 124A, and a GO activation function 125 A.

Figure 4:
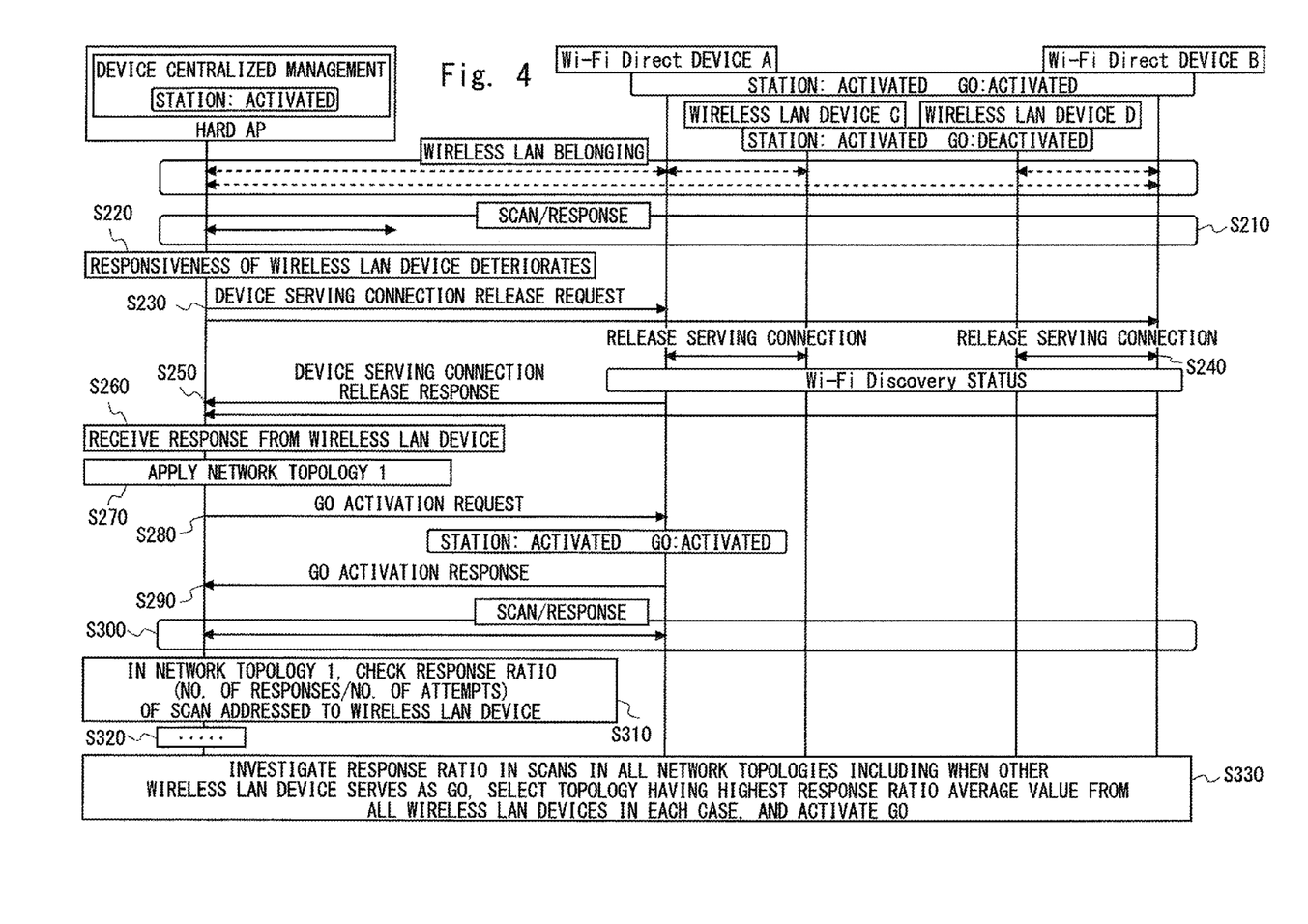
FIG. 4 is a sequence diagram for describing a wireless communication method according to the second embodiment.

FIG. 4 is a sequence diagram for describing a wireless communication method according to the second embodiment. In FIG. 4, the Wi-Fi Direct devices 120A and 120B and the wireless LAN devices 120C and 120D are referred to as Wi-Fi Direct devices A and B and wireless LAN devices C and D, respectively.

In the wireless communication system 1, initially, in the Wi-Fi Direct devices 120A and 120B, the station functions 121A and 121B and the GO functions 122A and 122B are activated, respectively, and in each of the wireless LAN devices 120C and 120D, the station function is activated, and the GO function is deactivated.

When the responsiveness of the wireless LAN device deteriorates (Steps S210 and S220), the serving connection release functions 124A and 124B of the Wi-Fi Direct devices 120A and 120B release connections with the serving wireless LAN devices 120C and 120D, respectively. Thus, all the devices are in the Wi-Fi Discovery status, i.e., the station functions are activated and the GO functions are deactivated (Steps S230 to S260).

Then, the network topology 1 is applied (Step S270), the GO function 122A of the Wi-Fi Direct device 120A is activated (Steps S280 and S290), and the responsiveness to the scan is checked (Steps S300 and S310). Likewise, other network topologies are applied, the Wi-Fi Direct devices 120A and 120B or the GO function 122 of the wireless LAN device are/is activated to check the responsiveness to the scan (Step S320). Next, the network topology having the highest responsiveness is extracted, and the Wi-Fi Direct devices 120A and 120B or the GO function 122 of the wireless LAN corresponding to the extracted network topology is/are activated (Step S330).

As described above, the wireless communication system or the wireless communication method according to the second embodiment includes the hard AP 110, the Wi-Fi Direct devices 120A and 120B, and the wireless LAN devices 120C and 120D. The wireless communication system or the wireless communication method according to the second embodiment automatically measures the communication quality in a small number of frames and reconfigure the network topology, thereby enabling wireless LAN communication over a path in which the influence of interrupting objects is small.

Although the present disclosure has been described with reference to the first and second embodiment of the invention, the present disclosure is not limited by them. Note that the present disclosure is not limited to the above-described embodiments, and modifications can be made as appropriate without departing from the scope thereof.

The present application is based upon and claims the benefit of priority from Japanese Patent Application No. 2015-054533, filed on Mar. 18, 2015, the entire contents of which are hereby incorporated by reference.

REFERENCE SIGNS LIST 1, 101 WIRELESS COMMUNICATION SYSTEM
10, 110 HARD AP
12, 112 DEVICE CENTRALIZED MANAGEMENT FUNCTION
15, 115 STATION FUNCTION
20, 120C, 120D WIRELESS LAN DEVICE
21, 121 STATION FUNCTION
22 SOFT AP FUNCTION
30, 130 WIRED LAN
120A, 120B Wi-Fi Direct DEVICE
122 Group Owner FUNCTION

The invention claimed is:

1. A wireless communication system comprising:
a hard AP including a station function; and
a plurality of wireless LAN devices each including a soft AP function, wherein
the hard AP
scans the soft AP of the wireless LAN device belonging to the hard AP,
detects deterioration of scan responsiveness of the soft AP,
deactivates the soft AP function of the wireless LAN device belonging to the hard AP,
activates the soft AP function of the wireless LAN device constituting a first combination, the first combination including one or a plurality of wireless LAN devices,
checks the scan responsiveness of the wireless LAN device included in the first combination,
activates the soft AP function of the wireless LAN device constituting other combination different from the first combination, the other combination including one or a plurality of wireless LAN devices,
checks the scan responsiveness of the wireless LAN device included in the other combination, and
activates the soft AP function of the wireless LAN device constituting a combination having higher scan responsiveness from between that of the first combination and that of the other combination.

2. A wireless communication method performed by a hard AP including a station function, the wireless communication method comprising steps of:
scanning a soft AP of a wireless LAN device belonging to the hard AP;
detecting deterioration of scan responsiveness of the soft AP;
deactivating the soft AP function of the wireless LAN device belonging to the hard AP;
activating the soft AP function of the wireless LAN device constituting a first combination, the first combination including one or a plurality of wireless LAN devices;
checking the scan responsiveness of the wireless LAN device included in the first combination;
activating the soft AP function of the wireless LAN device included in other combination different from the first combination, the other combination including one or a plurality of wireless LAN devices;

checking the scan responsiveness of the wireless LAN device included in the other combination; and activating the soft AP function of the wireless LAN devices included in a combination having higher scan responsiveness from between that of the first combination and that of the other combination.

3. A non-transitory computer readable medium storing a wireless communication program for causing the hard AP to execute the respective steps of the wireless communication method according to claim 2.

* * * * *